US009846818B2

(12) United States Patent
Jiang et al.

(10) Patent No.: US 9,846,818 B2
(45) Date of Patent: Dec. 19, 2017

(54) OBJECTIVE ASSESSMENT METHOD FOR COLOR IMAGE QUALITY BASED ON ONLINE MANIFOLD LEARNING

(71) Applicant: Ningbo University, Ningbo, Zhejiang (CN)

(72) Inventors: Gangyi Jiang, Zhejiang (CN); Meiling He, Zhejiang (CN); Fen Chen, Zhejiang (CN); Yang Song, Zhejiang (CN)

(73) Assignee: Ningbo University, Ningbo, Zhejiang (CN)

( * ) Notice: Subject to any disclaimer, the term of this patent is extended or adjusted under 35 U.S.C. 154(b) by 0 days.

(21) Appl. No.: 15/197,604

(22) Filed: Jun. 29, 2016

(65) Prior Publication Data

US 2017/0286798 A1    Oct. 5, 2017

(30) Foreign Application Priority Data

Mar. 31, 2016    (CN) .......................... 2016 1 0202181

(51) Int. Cl.
| | |
|---|---|
| *G06K 9/46* | (2006.01) |
| *G06T 7/20* | (2017.01) |
| *G06T 7/60* | (2017.01) |
| *G06K 9/52* | (2006.01) |
| *G06K 9/62* | (2006.01) |

(52) U.S. Cl.
CPC ......... *G06K 9/4652* (2013.01); *G06K 9/4671* (2013.01); *G06K 9/52* (2013.01); *G06K 9/6201* (2013.01); *G06T 7/20* (2013.01); *G06T 7/60* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 8,340,437 | B2 * | 12/2012 | Abramoff | G06K 9/6231 382/165 |
| 2012/0275642 | A1 * | 11/2012 | Aller | H04M 1/72522 382/100 |
| 2016/0104054 | A1 * | 4/2016 | Lin | G06T 11/60 382/192 |
| 2017/0177975 | A1 * | 6/2017 | Yu | G06K 9/6215 |

* cited by examiner

*Primary Examiner* — Delomia L Gilliard

(57) ABSTRACT

An objective assessment method for a color image quality based on online manifold learning considers a relationship between a saliency and an image quality objective assessment. Through a visual saliency detection algorithm, saliency maps of a reference image and a distorted image are obtained for further obtaining a maximum fusion saliency map. Based on maximum saliencies of image blocks in the maximum fusion saliency map, a saliency difference between each reference image block and a corresponding distorted image block is measured through an absolute difference, and thus reference visual important image blocks and distorted visual important image blocks are screened and extracted. Through manifold eigenvectors of the reference visual important image blocks and the distorted visual important image blocks, an objective quality assessment value of the distorted image is calculated. The method has an increased assessment effect and a higher correlation between an objective assessment result and a subjective perception.

5 Claims, 4 Drawing Sheets

OBJECTIVE ASSESSMENT METHOD FOR COLOR IMAGE QUALITY BASED ON ONLINE MANIFOLD LEARNING

CROSS REFERENCE OF RELATED APPLICATION

The application claims priority under 35 U.S.C. 119(a-d) to CN 201610202181.5, filed Mar. 31, 2016.

BACKGROUND OF THE PRESENT INVENTION

Field of Invention

The present invention relates to an image quality assessment method, and more particularly to an objective assessment method for a color image quality based on online manifold learning.

Description of Related Arts

Because of the performance limitation of the image processing system, during image obtaining, transmission and coding, various kinds of the distortions are introduced. The introduction of the distortions decreases the image quality, and meanwhile has an adverse impact on obtaining the information from the image. The image quality is an important index for comparing the performances of the various image processing algorithms and the image processing system parameters. Thus, in the fields of image transmission, multi-media network communication and video analysis, it is important to construct an effective image quality assessment method. Conventionally, the image quality assessment methods are divided into the subjective assessment methods and the objective assessment methods. Because the final receiver of the image is human, the subjective assessment methods are the most reliable assessment methods. However, the subjective assessment methods are time-consuming, and difficult to be embedded into the image processing system, so that the subjective assessment methods are limited in the practical application. In comparison, the objective assessment methods have the advantages of the simple operation and the good practicability, and currently are the research emphasis in academia and even industry.

Conventionally, the easiest and the most widely applied objective assessment methods are the peak signal-to-noise ratio (PSNR) method and the mean square error (MSE) method. The two methods have the simple calculation and the definite physical significance. However, because the visual characteristics of the human eyes are not considered, the assessment result thereof generally does not conform to the subjective perception of the human eyes. In fact, the human eyes do not process the image signal point by point. Therefore, the researchers introduce the visual characteristics of the human eyes, so that the objective assessment result has a higher conformity with the visual perception of the human eyes. For example, a method based on the structural similarity (SSIM) represents the structural information of the image from the brightness, the contrast, and the structure of the image, so as to further assess the image quality. Subsequently, based on the SSIM method, the multi-scale SSIM assessment method, the complex wavelet SSIM assessment method and the SSIM assessment method based on the information content weighting are proposed, which improve the performance of the SSIM method.

Besides the assessment methods based on the SSIM, Sheikh et al. see the full-reference image quality assessment as the information fidelity problem, and, according to the loss amount of the image information during the quantization distortion, propose an image quality assessment method based on the visual information fidelity (VIF). From the critical threshold and the above-threshold characteristics of the visual perception of the image, combined with the wavelet transform, Chandler et al. propose an image quality assessment method based on the wavelet visual signal-to-noise ratio (VSNR), which is able to relatively well adapt to the different visual conditions. Although the researchers have deeply researched the human visual system, because of the complexity of the human visual system, the researchers still have little cognition on the human visual system. Thus, it is still failed to propose an objective assessment method for the image quality, which is completely consistent with the subjective perception of the human eyes.

In order to better reflect the characteristics of the human visual system, the objective assessment methods for the image quality based on the sparse representation and the visual attention have gained more and more attentions. A number of the researches indicate that the sparse representation is able to well describe the neuronal activities in the primary visual cortex of the human brain. For example, Guha et al. disclose an image quality assessment method based on the sparse representation. The method is divided into two phases, respectively the dictionary learning phase and the assessment phase. The dictionary learning phase as the first phase is to randomly choose the image blocks from the reference image to serve as the training samples, and then obtain the over-complete dictionary through training with the k-means singular value decomposition (K-SVD) algorithm. The assessment phase as the second phase is to process the image blocks of the reference image and the image blocks of the corresponding distorted image with the sparse coding through the orthogonal matching pursuit (OMP) algorithm, then obtain the sparse coefficients of the reference image and the distorted image, and further obtain the objective image assessment value of the distorted image. However, all of the objective assessment methods for the image quality based on the sparse representation utilize the OMP algorithm to proceed the sparse coding, which needs the high computational cost. Moreover, the objective assessment methods for the image quality based on the sparse representation obtain the over-complete dictionary through the off-line operation, which needs a large number of the effective natural images to serve as the training samples.

For the digital image which is the high dimensional data, a large number of the information redundancies exist substantially, which requires to be processed through the dimensionality reduction technology. Moreover, while reducing the dimensionality, the essential structure thereof is expected to be maintained. Since the manifold learning method was firstly proposed in the famous science magazine, *Science*, in 2000, the manifold learning method has become the research hotspot in the information science field. If the data are assumed to be uniformly sampled from the low dimensional manifold in the high dimensional Euclidean space, the manifold learning is to recover the low dimensional structure from the high dimensional sampling data, namely to find the low dimensional manifold in the high dimensional space and obtain the corresponding embedded mapping, for realizing the dimensionality reduction. Some researches indicate that: the manifold is the basis of the perception, and the human brain perceives the objects in the manifold manner. In recent years, the manifold learning has been widely applied in image denoising, face recognition and human behavior detection, and achieved relatively good effects. For the problem that the column vector in the locality preserving projection (LPP) algorithm is not orthogonal, Deng et al. improve the LPP algorithm and obtain the orthogonal locality preserving projection (OLPP) algorithm which is able to find the manifold structure of the data, has the linear features, and achieves the good locality preserving ability and the judging ability. The manifold learning is able to simulate the description of the image signal in the primary visual cortex cells and further accurately extract the visual perception characteristics of the image. The low dimensional manifold characteristics of the image relatively well describe the nonlinear variation relationship among each distorted image, and the distorted images in the manifold space are arranged according to the variation type and intensity. Thus, it is necessary to research an objective assessment method for the image quality based on the manifold learning with the objective assessment result having the high conformity with the visual perception of the human eyes.

SUMMARY OF THE PRESENT INVENTION

An object of the present invention is to provide an objective assessment method for a color image quality based on online manifold learning, which is able to effectively increase a correlation between an objective assessment result and a subjective perception.

Technical solutions of the present invention are described as follows.

An objective assessment method for a color image quality based on online manifold learning comprises steps of:

① representing an undistorted reference image having a width W and a height H by $I^R$; and representing a distorted image to be assessed, which is corresponding to the $I^R$, by $I^D$;

② through a visual saliency detection algorithm, respectively obtaining saliency maps of the $I^R$ and the $I^D$, correspondingly denoted as $M^R$ and $M^D$; then, according to the $M^R$ and the $M^D$, calculating a maximum fusion saliency map, denoted as $M^F$; and denoting a pixel value of a pixel having coordinates of (x, y) in the $M^F$ as $M^F(x, y)$, $M^F(x, y)=\max(M^R(x, y), M^D(x, y))$, wherein: $1 \le x \le W$, $1 \le y \le H$; the max( ) is a function to find a maximum; the $M^R(x, y)$ represents a pixel value of a pixel having coordinates of (x, y) in the $M^R$; and the $M^D(x, y)$ represents a pixel value of a pixel having coordinates of (x, y) in the $M^D$;

③ respectively dividing the $I^R$, the $I^D$, the $M^R$, the $M^D$, and the $M^F$ into $$\frac{W \times H}{8 \times 8}$$

image blocks, which are not overlapping mutually and have a size of 8×8;

vectorizing color values of R, G, and B channels of all pixels in each image block of the $I^R$ and the $I^D$; denoting a color vector obtained through vectorizing the color values of the R, the G, and the B channels of all the pixels in a $j^{th}$ image block of the $I^R$ as $X_j^R$; denoting a color vector obtained through vectorizing the color values of the R, the G, and the B channels of all the pixels in a $j^{th}$ image block of the $I^D$ as $X_j^D$; wherein: the j has an initial value of 1, $$1 \le j \le \frac{W \times H}{8 \times 8};$$

both of the $X_j^R$ and the $X_j^D$ have a dimensionality of 192×1; values of a $1^{st}$ element to a $64^{th}$ element in the $X_j^R$ respectively correspond to the color value of the R channel of each pixel in the $j^{th}$ image block of the $I^R$ in a line-by-line scanning manner; values of a $65^{th}$ element to a $128^{th}$ element in the $X_j^R$ respectively correspond to the color value of the G channel of each pixel in the $j^{th}$ image block of the $I^R$ in the line-by-line scanning manner; values of a $129^{th}$ element to a $192^{nd}$ element in the $X_j^R$ respectively correspond to the color value of the B channel of each pixel in the $j^{th}$ image block of the $I^R$ in the line-by-line scanning manner; values of a $1^{st}$ element to a $64^{th}$ element in the $X_j^D$ respectively correspond to the color value of the R channel of each pixel in the $j^{th}$ image block of the $I^D$ in the line-by-line scanning manner; values of a $65^{th}$ element to a $128^{th}$ element in the $X_j^D$ respectively correspond to the color value of the G channel of each pixel in the $j^{th}$ image block of the $I^D$ in the line-by-line scanning manner; and values of a $129^{th}$ element to a $192^{nd}$ element in the $X_j^D$ respectively correspond to the color value of the B channel of each pixel in the $j^{th}$ image block of the $I^D$ in the line-by-line scanning manner; and vectorizing pixel values of all pixels in each image block of the $M^R$, the $M^D$, and the $M^F$; denoting a pixel value vector obtained through vectorizing the pixel values of all the pixels in a $j^{th}$ image block of the $M^R$ as $S_j^R$; denoting a pixel value vector obtained through vectorizing the pixel values of all the pixels in a $j^{th}$ image block of the $M^D$ as $S_j^D$; and denoting a pixel value vector obtained through vectorizing the pixel values of all the pixels in a $j^{th}$ image block of the $M^F$ as $S_j^F$; wherein: the $S_j^R$, the $S_j^D$, and the $S_j^F$ all have a dimensionality of 64×1; values of a $1^{st}$ element to a $64^{th}$ element in the $S_j^R$ respectively correspond to the pixel value of each pixel in the $j^{th}$ image block of the $M^R$ in the line-by-line scanning manner; values of a $1^{st}$ element to a $64^{th}$ element in the $S_j^D$ respectively correspond to the pixel value of each pixel in the $j^{th}$ image block of the $M^D$ in the line-by-line scanning manner; and values of a $1^{st}$ element to a $64^{th}$ element in the $S_j^F$ respectively correspond to the pixel value of each pixel in the $j^{th}$ image block of the $M^F$ in the line-by-line scanning manner;

④ calculating a saliency of each image block in the $M^F$; and denoting the saliency of the $j^{th}$ image block in the $M^F$ as $d_j$, $$d_j = \sum_{i=1}^{64} S_j^F(i),$$

wherein: $1 \le i \le 64$ and the $S_j^F(i)$ represents a value of an $i^{th}$ element in the $S_j^F$;

orderly arranging the saliencies of all the image blocks in the $M^F$, from the biggest to the smallest; and, after arranging, determining sequence numbers of the image blocks corresponding to former $t_1$ saliencies, wherein:

$$t_1 = \lambda_1 \times \frac{W \times H}{8 \times 8};$$

the $\lambda_1$ represents an image block selection proportionality coefficient; and $\lambda_1 \in (0,1]$; and finding the image blocks in the $I^R$, which are corresponding to the determined $t_1$ sequence numbers, and defining as reference image blocks; finding the image blocks in the $I^D$, which are corresponding to the determined $t_1$ sequence numbers, and defining as distorted image blocks; finding the image blocks in the $M^R$, which are corresponding to the determined $t_1$ sequence numbers, and defining as reference saliency image blocks; finding the image blocks in the $M^D$, which are corresponding to the determined $t_1$ sequence numbers, and defining as distorted saliency image blocks;

⑤ measuring a saliency difference between each reference image block in the $I^R$ and a corresponding distorted image block in the $I^D$ through an absolute difference; and denoting a saliency difference between a $t'^{th}$ reference image block in the $I^R$ and a $t'^{th}$ distorted image block in the $I^D$ as $e_{t'}$, $$e_{t'} = \frac{1}{64}\sum_{i=1}^{64} |\tilde{S}_{t'}^R(i) - \tilde{S}_{t'}^D(i)|,$$

wherein: the t' has an initial value of 1, $1 \le t' \le t_1$; the symbol "||" is an absolute value symbol; the $\tilde{S}_{t'}^R(i)$ represents a value of an $i^{th}$ element in a pixel value vector $\tilde{S}_{t'}^R$ corresponding to a $t'^{th}$ reference saliency image block in the $M^R$; and the $\tilde{S}_{t'}^D(i)$ represents a value of an $i^{th}$ element in a pixel value vector $\tilde{S}_{t'}^D$ corresponding to a $t'^{th}$ distorted saliency image block in the $M^D$; and orderly arranging the measured $t_1$ saliency differences, from the biggest to the smallest; after arranging, determining the reference image blocks and the distorted image blocks corresponding to former $t_2$ saliency differences; defining the determined $t_2$ reference image blocks as reference visual important image blocks, and adopting a matrix formed by color vectors corresponding to all the reference visual important image blocks as a reference visual important image block matrix, denoted as $Y^R$; defining the determined $t_2$ distorted image blocks as distorted visual important image blocks, and adopting a matrix formed by color vectors corresponding to all the distorted visual important image blocks as a distorted visual important image block matrix, denoted as $Y^D$; wherein: $t_2 = \lambda_2 \times t_1$, the $\lambda_2$ represents a selection proportionality coefficient of the reference image blocks and the distorted image blocks, and $\lambda_2 \in (0,1]$; the $Y^R$ and the $Y^D$ have a dimensionality of $192 \times t_2$; a $t''^{th}$ column vector in the $Y^R$ is a color vector corresponding to a determined $t''^{th}$ reference visual important image block; a $t''^{th}$ column vector in the $Y^D$ is a color vector corresponding to a determined $t''^{th}$ distorted visual important image block; and the t has an initial value of 1, $1 \le t'' \le t_2$;

⑥ centralizing the $Y^R$ through subtracting a mean value of values of all elements in each column vector from a value of each element in the same column vector of the $Y^R$; and denoting an obtained centralized matrix as Y, wherein the Y has a dimensionality of $192 \times t_2$; and processing the Y with dimensionality reduction and whitening through a principal component analysis; and, denoting an obtained matrix after the dimensionality reduction and the whitening as $Y^w$, $Y^w = W \times Y$; wherein: the $Y^w$ has a dimensionality of $M \times t_2$; the W represents a whitened matrix and has a dimensionality of $M \times 192$, $1 < M \ll 192$; and the symbol "$\ll$" is a much-less-than symbol;

⑦ online training the $Y^w$ through an orthogonal locality preserving projection algorithm; and obtaining a characteristic basis matrix of the $Y^w$, denoted as D, wherein the D has a dimensionality of $M \times 192$;

⑧ according to the $Y^R$ and the D, calculating a manifold eigenvector of each reference visual important image block; denoting the manifold eigenvector of a $t''^{th}$ reference visual important image block as $u_{t''}$, $u_{t''} = D \times y_{t''}^R$, wherein: the $u_{t''}$ has a dimensionality of $M \times 1$, and the $y_{t''}^R$ is the $t''^{th}$ column vector in the $Y^R$; according to the $Y^D$ and the D, calculating a manifold eigenvector of each distorted visual important image block; and denoting the manifold eigenvector of a $t''^{th}$ distorted visual important image block as $v_{t''}$, $v_{t''} = D \times y_{t''}^D$, wherein: the $v_{t''}$ has a dimensionality of $M \times 1$, and the $y_{t''}^D$ is the $t''^{th}$ column vector in the $Y^D$; and ⑨ according to the manifold eigenvectors of all the reference visual important image blocks and the manifold eigenvectors of all the distorted visual important image blocks, calculating an objective quality assessment value of the $I^D$, denoted as Score, $$\text{Score} = \frac{1}{t_2 \times M}\sum_{t''=1}^{t_2}\sum_{m=1}^{M} \frac{2 \times u_{t''}(m) \times v_{t''}(m) + c}{(u_{t''}(m))^2 + (v_{t''}(m))^2 + c},$$

wherein: $1 \le m \le M$; the $u_{t''}(m)$ represents a value of an $m^{th}$ element in the $u_{t''}$; the $v_{t''}(m)$ represents a value of an $m^{th}$ element in the $v_{t''}$; and the c is a small constant for guaranteeing a result stability.

Preferably, the $Y^w$ in the step ⑥ is obtained through following steps of:

⑥_1, representing a covariance matrix of the Y by C, $$C = \frac{1}{t_2}(Y \times Y^T),$$

wherein: the C has a dimensionality of $192 \times 192$, and the $Y^T$ is a transposition of the Y;

⑥_2, processing the C with eigenvalue decomposition, and obtaining all maximum eigenvalues and corresponding eigenvectors, wherein the eigenvectors have a dimensionality of $192 \times 1$;

⑥_3, choosing M maximum eigenvalues and corresponding M eigenvectors;

⑥_4, according to the chosen M maximum eigenvalues and the corresponding M eigenvectors, calculating the whitened matrix W, $W = \Psi^{-1/2} \times E^T$, wherein: the $\Psi$ has a dimensionality of $M \times M$, $\Psi = \text{diag}(\psi_1, \ldots, \psi_M)$, $\Psi^{-1/2} = \text{diag}(1/\sqrt{\psi_1}, \ldots, 1/\sqrt{\psi_M})$; the E has a dimensionality of $192 \times M$, $E = [e_1, \ldots, e_M]$; the diag( ) is a main-diagonal matrix representation; the $\psi_1, \ldots, \psi_M$ correspondingly represent a $1^{st}$ to a $M^{th}$ chosen maximum eigenvalue; and, the $e_1, \ldots, e_M$ correspondingly represent a $1^{st}$ to a $M^{th}$ chosen eigenvector; and ⑥_5, according to the W, processing the Y with the whitening, and obtaining the $Y^w$ after the dimensionality reduction and the whitening, $Y_w = W \times Y$.

Preferably, in the step ④, $\lambda_1 = 0.7$.

Preferably, in the ⑤, $\lambda_2 = 0.6$.

Preferably, in the step ⑨, $c = 0.04$.

Compared with prior arts, the present invention has following advantages.

1) The method provided by the present invention considers a relationship between the saliency and the objective assessment of the image quality. Through the visual saliency detection algorithm, the saliency maps of the reference image and the distorted image are obtained for further obtaining the maximum fusion saliency map. Moreover, based on maximum saliencies of the image blocks in the maximum fusion saliency map, the saliency difference between each reference image block and the corresponding distorted image block is measured through the absolute difference, and thus the reference visual important image blocks and the distorted visual important image blocks are screened and extracted. Furthermore, through the manifold eigenvectors of the reference visual important image blocks and the distorted visual important image blocks, the objective quality assessment value of the distorted image is calculated. The method provided by the present invention has an obviously increased assessment effect and a higher correlation between an objective assessment result and a subjective perception.

2) The method provided by the present invention finds an inner geometric structure of data from image data through the manifold learning, and obtains the characteristic basis matrix after training. Through the characteristic basis matrix, the method further processes the reference visual important image blocks and the distorted visual important image blocks with the dimensionality reduction and obtains the manifold eigenvector. The manifold eigenvector after the dimensionality reduction still maintains geometric characteristics of high dimensional image data, and thus redundant information is decreased. Thus, when calculating the objective quality assessment value of the distorted image, the method provided by the present invention is easier and more accurate.

3) For conventional objective assessment methods for the image quality based on sparse representation, off-line learning of a over-complete dictionary needs a large number of effective training samples, and has a limitation on processing images having real-time requirements. For the above-described problem, the present invention online learns and trains the extracted reference visual important image blocks through the orthogonal locality preserving projection algorithm for obtaining the characteristic basis matrix in real-time. Thus, the present invention has a higher robustness and a more stable assessment effect.

These and other objectives, features, and advantages of the present invention will become apparent from the following detailed description, the accompanying drawings, and the appended claims.

DETAILED DESCRIPTION OF THE PREFERRED EMBODIMENT

The present invention is further described with accompanying drawings and the preferred embodiment.

Figure 1:
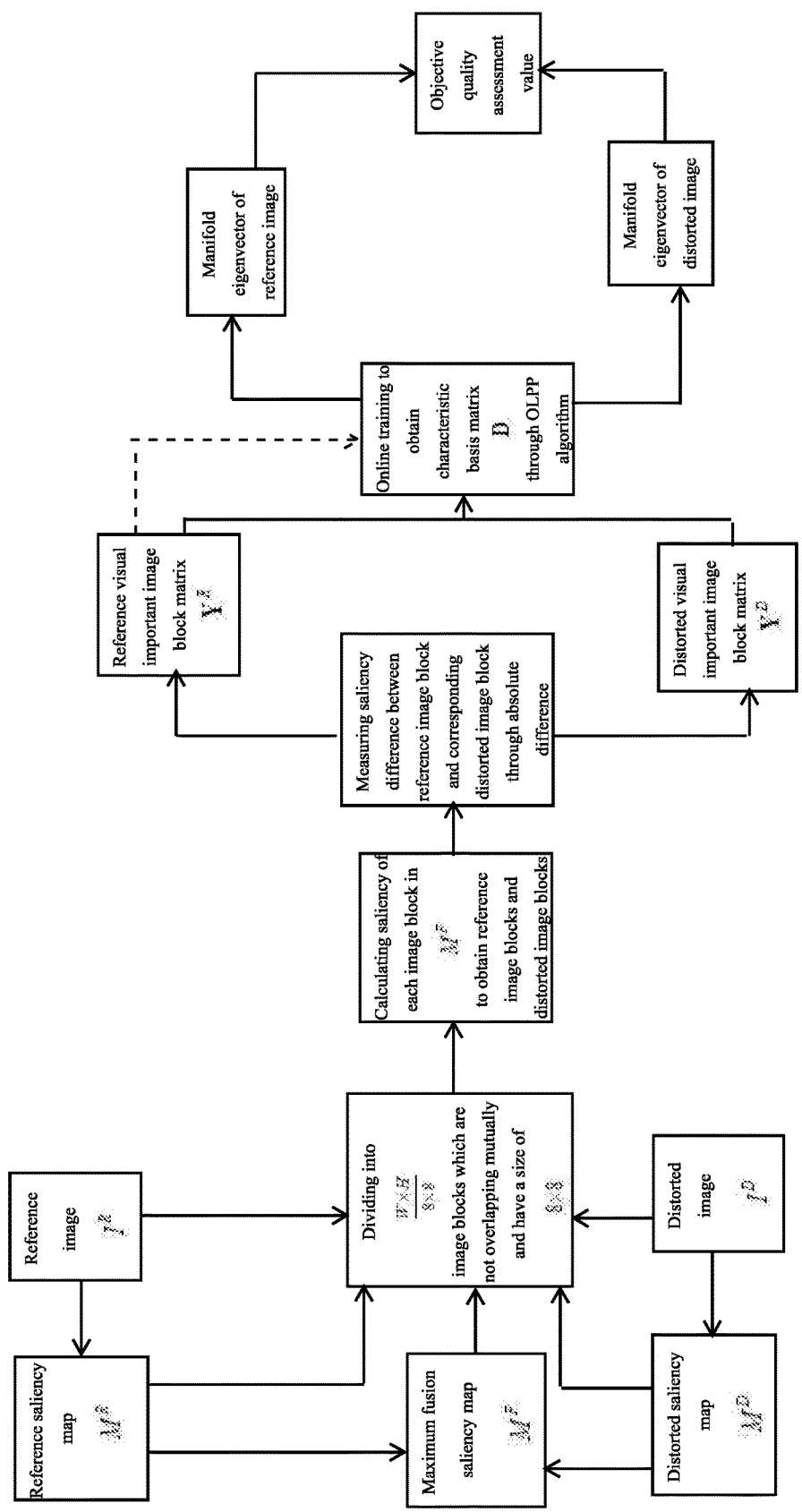
FIG. 1 is an implementation block diagram of an objective assessment method for a color image quality based on online manifold learning according to a preferred embodiment of the present invention.

According to a preferred embodiment of the present invention, the present invention provides an objective assessment method for a color image quality based on online manifold learning, wherein an implementation block diagram thereof is showed in FIG. 1, and the method comprises steps of:

① representing an undistorted reference image having a width W and a height H by $I^R$; and representing a distorted image to be assessed, which is corresponding to the $I^R$, by $I^D$;

② through a conventional visual saliency detection algorithm, named Saliency Detection based on Simple Priors (SDSP) herein, respectively obtaining saliency maps of the $I^R$ and the $I^D$, correspondingly denoted as $M^R$ and $M^D$; then, according to the $M^R$ and the $M^D$, calculating a maximum fusion saliency map, denoted as $M^F$; and denoting a pixel value of a pixel having coordinates of (x, y) in the $M^F$ as $M^F(x, y)$, $M^F(x, y)=\max(M^R(x, y), M^D(x, y))$, wherein: $1 \le x \le W$, $1 \le y \le H$; the max( ) is a function to find a maximum; the $M^R(x, y)$ represents a pixel value of a pixel having coordinates of (x, y) in the $M^R$; and the $M^D(x, y)$ represents a pixel value of a pixel having coordinates of (x, y) in the $M^D$;

③ respectively dividing the $I^R$, the $I^D$, the $M^R$, the $M^D$, and the $M^F$ into $$\frac{W \times H}{8 \times 8}$$

image blocks, which are not overlapping mutually and have a size of 8×8; if a size of the $I^R$, the $I^D$, the $M^R$, the $M^D$, and the $M^F$ is indivisible by 8×8, redundant pixels are not processed;

vectorizing color values of R, G, and B channels of all pixels in each image block of the $I^R$ and the $I^D$; denoting a color vector obtained through vectorizing the color values of the R, the G, and the B channels of all the pixels in a $j^{th}$ image block of the $I^R$ as $X_j^R$; denoting a color vector obtained through vectorizing the color values of the R, the G, and the B channels of all the pixels in a $j^{th}$ image block of the $I^D$ as $X_j^D$; wherein: the j has an initial value of 1, $$1 \le j \le \frac{W \times H}{8 \times 8};$$

both of the $X_j^R$ and the $X_j^D$ have a dimensionality of 192×1; values of a $1^{st}$ element to a $64^{th}$ element in the $X_j^R$ respectively correspond to the color value of the R channel of each pixel in the $j^{th}$ image block of the $I^R$ in a line-by-line scanning manner, namely the value of the $1^{st}$ element in the $X_j^R$ is the color value of the R channel of a pixel in a $1^{st}$ row and a $1^{st}$ column of the $j^{th}$ image block of the $I^R$, the value of a $2^{nd}$ element in the $X_j^R$ is the color value of the R channel of a pixel in the $1^{st}$ row and a $2^{nd}$ column of the $j^{th}$ image block of the $I^R$, and so on; values of a $65^{th}$ element to a $128^{th}$ element in the $X_j^R$ respectively correspond to the color value of the G channel of each pixel in the $j^{th}$ image block of the $I^R$ in the line-by-line scanning manner, namely the value of the $65^{th}$ element in the $X_j^R$ is the color value of the G channel of a pixel in a $1^{st}$ row and a $1^{st}$ column of the $j^{th}$ image block of the $I^R$, the value of a $66^{th}$ element in the $X_j^R$ is the color value of the G channel of a pixel in the $1^{st}$ row and a $2^{nd}$ column of the $j^{th}$ image block of the $I^R$, and so on; values of a $129^{th}$ element to a $192^{nd}$ element in the $X_j^R$ respectively correspond to the color value of the B channel of each pixel in the $j^{th}$ image block of the $I^R$ in the line-by-line scanning manner, namely the value of the $129^{th}$ element in the $X_j^R$ is the color value of the B channel of a pixel in a $1^{st}$ row and a $1^{st}$ column of the $j^{th}$ image block of the $I^R$, the value of a $130^{th}$ element in the $X_j^R$ is the color value of the B channel of a pixel in the $1^{st}$ row and a $2^{nd}$ column of the $j^{th}$ image block of the $I^R$, and so on; values of a $1^{st}$ element to a $64^{th}$ element in the $X_j^D$ respectively correspond to the color value of the R channel of each pixel in the $j^{th}$ image block of the $I^D$ in the line-by-line scanning manner, namely the value of the $1^{st}$ element in the $X_j^D$ is the color value of the R channel of a pixel in a $1^{st}$ row and a $1^{st}$ column of the $j^{th}$ image block of the $I^D$, the value of a $2^{nd}$ element in the $X_j^D$ is the color value of the R channel of a pixel in the $1^{st}$ row and a $2^{nd}$ column of the $j^{th}$ image block of the $I^D$, and so on; values of a $65^{th}$ element to a $128^{th}$ element in the $X_j^D$ respectively correspond to the color value of the G channel of each pixel in the $j^{th}$ image block of the $I^D$ in the line-by-line scanning manner, namely the value of the $65^{th}$ element in the $X_j^D$ is the color value of the G channel of a pixel in a $1^{st}$ row and a $1^{st}$ column of the $j^{th}$ image block of the $I^D$, the value of a $66^{th}$ element in the $X_j^D$ is the color value of the G channel of a pixel in the $1^{st}$ row and a $2^{nd}$ column of the $j^{th}$ image block of the $I^D$, and so on; and values of a $129^{th}$ element to a $192^{nd}$ element in the $X_j^D$ respectively correspond to the color value of the B channel of each pixel in the $j^{th}$ image block of the $I^D$ in the line-by-line scanning manner, namely the value of the $129^{th}$ element in the $X_j^D$ is the color value of the B channel of a pixel in a $1^{st}$ row and a $1^{st}$ column of the $j^{th}$ image block of the $I^D$, the value of a $130^{th}$ element in the $X_j^D$ is the color value of the B channel of a pixel in the $1^{st}$ row and a $2^{nd}$ column of the $j^{th}$ image block of the $I^D$, and so on; and vectorizing pixel values of all pixels in each image block of the $M^R$, the $M^D$, and the $M^F$; denoting a pixel value vector obtained through vectorizing the pixel values of all the pixels in a $j^{th}$ image block of the $M^R$ as $S_j^R$; denoting a pixel value vector obtained through vectorizing the pixel values of all the pixels in a $j^{th}$ image block of the $M^D$ as $S_j^D$; and denoting a pixel value vector obtained through vectorizing the pixel values of all the pixels in a $j^{th}$ image block of the $M^F$ as $S_j^F$; wherein: the $S_j^R$, the $S_j^D$, and the $S_j^F$ all have a dimensionality of 64×1; values of a $1^{st}$ element to a $64^{th}$ element in the $S_j^R$ respectively correspond to the pixel value of each pixel in the $j^{th}$ image block of the $M^R$ in the line-by-line scanning manner, namely the value of the $1^{st}$ element in the $S_j^R$ is the pixel value of a pixel in a $1^{st}$ row and a $1^{st}$ column of the $j^{th}$ image block of the $M^R$, the value of a $2^{nd}$ element in the $S_j^R$ is the pixel value of a pixel in the $1^{st}$ row and a $2^{nd}$ column of the $j^{th}$ image block of the $M^R$, and so on; values of a $1^{st}$ element to a $64^{th}$ element in the $S_j^D$ respectively correspond to the pixel value of each pixel in the $j^{th}$ image block of the $M^D$ in the line-by-line scanning manner, namely the value of the $1^{st}$ element in the $S_j^D$ is the pixel value of a pixel in a $1^{st}$ row and a $1^{st}$ column of the $j^{th}$ image block of the $M^D$, the value of a $2^{nd}$ element in the SD is the pixel value of a pixel in the $1^{st}$ row and a $2^{nd}$ column of the $j^{th}$ image block of the $M^D$, and so on; and values of a $1^{st}$ element to a $64^{th}$ element in the $S_j^F$ respectively correspond to the pixel value of each pixel in the $j^{th}$ image block of the $M^F$ in the line-by-line scanning manner, namely the value of the $1^{st}$ element in the $S_j^F$ is the pixel value of a pixel in a $1^{st}$ row and a $1^{st}$ column of the $j^{th}$ image block of the $M^F$, the value of a $2^{nd}$ element in the $S_j^F$ is the pixel value of a pixel in the $1^{st}$ row and a $2^{nd}$ column of the $j^{th}$ image block of the $M^F$, and so on;

④ calculating a saliency of each image block in the $M^F$; and denoting the saliency of the $j^{th}$ image block in the $M^F$ as $d_j$, $$d_j = \sum_{i=1}^{64} S_j^F(i),$$

wherein: $1 \leq i \leq 64$; and the $S_j^F(i)$ represents a value of an $i^{th}$ element in the $S_j^F$, namely a pixel value of an $i^{th}$ pixel in the $j^{th}$ image block of the $M^F$;

orderly arranging the saliencies of all the image blocks in the $M^F$, from the biggest to the smallest; and, after arranging, determining sequence numbers of the image blocks corresponding to former $t_1$ saliencies (namely maximum $t_1$ saliencies), wherein:

$$t_1 = \lambda_1 \times \frac{W \times H}{8 \times 8};$$

the $\lambda_1$ represents an image block selection proportionality coefficient, $\lambda_1 \in (0,1]$; and it is embodied that $\lambda_1 = 0.7$ herein; and finding the image blocks in the $I^R$, which are corresponding to the determined $t_1$ sequence numbers, and defining as reference image blocks; finding the image blocks in the $I^D$, which are corresponding to the determined $t_1$ sequence numbers, and defining as distorted image blocks; finding the image blocks in the $M^R$, which are corresponding to the determined $t_1$ sequence numbers, and defining as reference saliency image blocks; finding the image blocks in the $M^D$, which are corresponding to the determined $t_1$ sequence numbers, and defining as distorted saliency image blocks;

⑤ measuring a saliency difference between each reference image block in the $I^R$ and a corresponding distorted image block in the $I^D$ through an absolute difference; and denoting a saliency difference between a $t'^{th}$ reference image block in the $I^R$ and a $t'^{th}$ distorted image block in the $I^D$ as $e_{t'}$, $$e_{t'} = \frac{1}{64} \sum_{i=1}^{64} |\tilde{S}_{t'}^R(i) - \tilde{S}_{t'}^D(i)|,$$

wherein: the $t'$ has an initial value of 1, $1 \leq t' \leq t_1$; the symbol "||" is an absolute value symbol; the $\tilde{S}_{t'}^R(i)$ represents a value of an $i^{th}$ element in a pixel value vector $\tilde{S}_{t'}^R$ corresponding to a $t'^{th}$ reference saliency image block in the $M^R$, namely a pixel value of an $i^{th}$ pixel in the $t'^{th}$ reference saliency image block of the $M^R$; and the $\tilde{S}_{t'}^D(i)$ represents a value of an $i^{th}$ element in a pixel value vector $\tilde{S}_{t'}^D$ corresponding to a $t'^{th}$ distorted saliency image block in the $M^D$, namely a pixel value of an $i^{th}$ pixel in the $t'^{th}$ distorted saliency image block of the $M^D$; and orderly arranging the measured $t_1$ saliency differences, from the biggest to the smallest; after arranging, determining the reference image blocks and the distorted image blocks corresponding to former $t_2$ saliency differences (namely maximum $t_2$ saliency differences); defining the determined $t_2$ reference image blocks as reference visual important image blocks, and adopting a matrix formed by color vectors corresponding to all the reference visual important image blocks as a reference visual important image block matrix, denoted as $Y^R$; defining the determined $t_2$ distorted image blocks as distorted visual important image blocks, and adopting a matrix formed by color vectors corresponding to all the distorted visual important image blocks as a distorted visual important image block matrix, denoted as $Y^D$; wherein: $t_2 = \lambda_2 \times t_1$; the $\lambda_2$ represents a selection proportionality coefficient of the reference image blocks and the distorted image blocks, $\lambda_2 \in (0,1]$; it is embodied that $\lambda_2 = 0.6$ herein; the $Y^R$ and the $Y^D$ have a dimensionality of $192 \times t_2$; a $t'''^{th}$ column vector in the $Y^R$ is a color vector corresponding to a determined $t'''^{th}$ reference visual important image block; a $t'''^{th}$ column vector in the $Y^D$ is a color vector corresponding to a determined $t'''^{th}$ distorted visual important image block; and the $t'''$ has an initial value of 1, $1 \le t''' \le t_2$;

⑥ centralizing the $Y^R$ through subtracting a mean value of values of all elements in each column vector from a value of each element in the same column vector of the $Y^R$; and denoting an obtained centralized matrix as Y, wherein the Y has a dimensionality of $192 \times t_2$; and processing the Y obtained after centralizing the $Y^R$ with dimensionality reduction and whitening through a conventional principal component analysis (PCA); and, denoting an obtained matrix after the dimensionality reduction and the whitening as $Y^w$, $Y_w = W \times Y$; wherein: the $Y^w$ has a dimensionality of $M \times t_2$; the W represents a whitened matrix and has a dimensionality of $M \times 192$, $1 < M \ll 192$; the symbol "$\ll$" is a much-less-than symbol; and, it is embodied that the PCA is realized through processing a covariance matrix of sample data with eigenvalue decomposition, namely the $Y^w$ in the step ⑥ is obtained through following steps of:

⑥_1, representing a covariance matrix of the Y by C, $$C = \frac{1}{t_2}(Y \times Y^T),$$

wherein: the C has a dimensionality of $192 \times 192$, and the $Y^T$ is a transposition of the Y;

⑥_2, processing the C with the eigenvalue decomposition, and obtaining all maximum eigenvalues and corresponding eigenvectors, wherein the eigenvectors have a dimensionality of $192 \times 1$;

⑥_3, choosing M maximum eigenvalues and corresponding M eigenvectors, so as to realize the dimensionality reduction of the Y, wherein: it is embodied that M=8 herein, namely merely former eight principle components are chosen for training and thus the dimensionality is decreased from 192 to M=8;

⑥_4, according to the chosen M maximum eigenvalues and the corresponding M eigenvectors, calculating the whitened matrix W, $W = \Psi^{-1/2} \times E^T$, wherein: the $\Psi$ has a dimensionality of $M \times M$, $\Psi = \text{diag}(\psi_1, \ldots, \psi_M)$, $\Psi^{-1/2} = \text{diag}(1/\sqrt{\psi_1}, \ldots, 1/\sqrt{\psi_M})$; the E has a dimensionality of $192 \times M$, $E = [e_1, \ldots, e_M]$; the diag( ) is a main-diagonal matrix representation; the $\psi_1, \ldots, \psi_M$ correspondingly represent a $1^{st}$ to a $M^{th}$ chosen maximum eigenvalue; and, the $e_1, \ldots, e_M$ correspondingly represent a $1^{st}$ to a $M^{th}$ chosen eigenvector; and ⑥_5, according to the W, processing the Y with the whitening, and obtaining the $Y^w$ after the dimensionality reduction and the whitening, $Y^w = W \times Y$;

⑦ online training the $Y^w$ through an orthogonal locality preserving projection (OLPP) algorithm; and obtaining a characteristic basis matrix of the $Y^w$, denoted as D, wherein the D has a dimensionality of $M \times 192$;

⑧ according to the $Y^R$ and the D, calculating a manifold eigenvector of each reference visual important image block; denoting the manifold eigenvector of a $t'''^{th}$ reference visual important image block as $u_{t'''}$, $u_{t'''} = D \times y_{t'''}^R$, wherein: the $u_{t'''}$ has a dimensionality of $M \times 1$, and the $y_{t'''}^R$ is the $t'''^{th}$ column vector in the $Y^R$; according to the $Y^D$ and the D, calculating a manifold eigenvector of each distorted visual important image block; and denoting the manifold eigenvector of a $t'''^{th}$ distorted visual important image block as $v_{t'''}$, $v_{t'''} = D \times y_{t'''}^D$, wherein: the $v_{t'''}$ has a dimensionality of $M \times 1$, and the $y_{t'''}^D$ is the $t'''^{th}$ column vector in the $Y^D$; and ⑨ according to the manifold eigenvectors of all the reference visual important image blocks and the manifold eigenvectors of all the distorted visual important image blocks, calculating an objective quality assessment value of the $I^D$, denoted as Score, $$\text{Score} = \frac{1}{t_2 \times M} \sum_{t'''=1}^{t_2} \sum_{m=1}^{M} \frac{2 \times u_{t'''}(m) \times v_{t'''}(m) + c}{(u_{t'''}(m))^2 + (v_{t'''}(m))^2 + c},$$

wherein: $1 \le m \le M$; the $u_{t'''}(m)$ represents a value of an $m^{th}$ element in the $u_{t'''}$; the $v_{t'''}(m)$ represents a value of an $m^{th}$ element in the $v_{t'''}$; the c is a small constant for guaranteeing a result stability, and it is embodied that c=0.04 herein.

In order to further illustrate effectiveness and feasibility of the method provided by the present invention, the method is tested.

According to the preferred embodiment of the present invention, three open authoritative image databases are chosen to be tested, respectively a LIVE image database, a CSIQ image database, a TID2008 image database. In Table 1, various indexes of the three image databases are described in detail. The various indexes comprise a reference image number, a distorted image number and a distorted type number. All of the three databases provide a mean subjective assessment difference of each distorted image.

TABLE 1 various indexes of authoritative image databases

| Image database | Reference image number | Distorted image number | Distorted type number |
| --- | --- | --- | --- |
| LIVE | 29 | 779 | 5 |
| CSIQ | 30 | 866 | 6 |
| TID2008 | 25 | 1700 | 17 |

Then, a correlation between the objective quality assessment value obtained by the method of the present invention and the mean subjective assessment difference of each distorted image is analyzed. Herein, three common objective parameters for assessing an image quality assessment method serve as assessment indexes. The three objective parameters are respectively a Pearson linear correlation coefficient (PLCC) which reflects a prediction accuracy, a Spearman rank order correlation coefficient (SROCC) which reflects a prediction monotonicity, and a root mean squared error (RMSE) which reflects a prediction consistency. A value range of the PLCC and the SROCC is [0, 1]. The nearer a value of the PLCC and the SROCC approximates to 1, the better an image quality objective assessment method is; otherwise, the image quality objective assessment method is worse. The smaller RMSE, the higher predication accuracy and the better performance of the image quality objective assessment method; otherwise, the predication accuracy is lower and the performance is worse.

For all distorted images in the above LIVE image database, CSIQ image database and TID2008 image database, the objective quality assessment value of each distorted image is calculated in a same manner through the steps ①-⑨ of the method provided by the present invention. The obtained correlation between the objective quality assessment value and the mean subjective assessment difference of the distorted image is analyzed. Firstly, the objective quality assessment value is obtained; then, the objective quality assessment value is processed with five-parameter Logistic function non-linear fitting; and finally, a performance index value between an objective assessment result and the mean subjective assessment difference is obtained. In order to verify the effectiveness of the present invention, on the three image databases listed in Table 1, the method provided by the present invention and other six conventional full-reference image quality objective assessment methods having a relatively advanced performance are comparatively analyzed. The PLCC, the SROCC, and the RMSE for representing an assessment performance of the methods are listed in Table 2. In Table 2, the six methods for comparing are respectively a classical peak signal-to-noise ratio (PSNR) method, an assessment method based on a structural similarity (SSIM) proposed by Z. Wang, a method based on a degradation model named Information Fidelity Criterion (IFC) proposed by N. Damera Venkata, a method based on a visual information fidelity (VIF) proposed by H. R. Sheikh, a method based on a wavelet visual signal-to-noise ratio (VSNR) proposed by D. M. Chandler, and an image quality assessment method based on a sparse representation denoted as Sparse Representation-based Quality (SPARQ) proposed by T. Guha. According to data listed in Table 2, on the LIVE image database, the method provided by the present invention has the second best performance after the VIF method; and, on the CSIQ image database and the TID image database, the method provided by the present invention has the best performance. Thus, for all of the above-described three image databases, the objective quality assessment value of the distorted image obtained by the method of the present invention has a good correlation with the mean subjective assessment difference. Moreover, the values of the PLCC and the SROCC of the LIVE image database and the CSIQ image database are all above 0.94; the values of the PLCC and the SROCC of the TID2008 image database having more complex distorted types also reach 0.82; and, after weighted averaging, compared with all of the six conventional methods, the performance of the method provided by the present invention has different degrees of improvement. Thus, the objective assessment result of the method provided by the present invention is relatively consistent with the subjective perception of the human eyes, and has a stable assessment effect, which fully illustrates the effectiveness of the method provided by the present invention.

TABLE 2 performance comparison between the method provided by the present invention and the conventional image quality objective assessment methods

| Image database | | PSNR | SSIM | IFC | VIF | VSNR | SPARQ | Method of present invention |
|---|---|---|---|---|---|---|---|---|
| LIVE | SROCC | 0.8756 | 0.9479 | 0.9259 | 0.9636 | 0.9274 | 0.9310 | 0.9523 |
| | PLCC | 0.8723 | 0.9449 | 0.9268 | 0.9604 | 0.9231 | 0.9280 | 0.9506 |
| | RMSE | 13.3600 | 8.9455 | 10.2641 | 7.6137 | 10.5060 | 10.1850 | 8.4433 |
| CSIQ | SROCC | 0.8057 | 0.8756 | 0.7671 | 0.9195 | 0.8106 | 0.9460 | 0.9465 |
| | PLCC | 0.8000 | 0.8613 | 0.8384 | 0.9277 | 0.8002 | 0.9390 | 0.9433 |
| | RMSE | 0.1575 | 0.1344 | 0.1431 | 0.0980 | 0.1575 | 0.0900 | 0.0871 |
| TID2008 | SROCC | 0.5531 | 0.7749 | 0.5675 | 0.7491 | 0.7046 | 0.7920 | 0.8356 |
| | PLCC | 0.5734 | 0.7732 | 0.7340 | 0.8084 | 0.6820 | 0.8200 | 0.8228 |
| | RMSE | 1.0994 | 0.8511 | 0.9113 | 0.7899 | 0.9815 | 0.7680 | 0.5975 |
| Average | SROCC | 0.6936 | 0.8413 | 0.7026 | 0.8432 | 0.7839 | 0.8642 | 0.9115 |
| | PLCC | 0.7017 | 0.8360 | 0.8059 | 0.8747 | 0.7687 | 0.8760 | 0.9056 |
| | RMSE | 4.8723 | 3.3103 | 3.7728 | 2.8339 | 3.8817 | 3.6810 | 3.0426 |

Figure 2A:
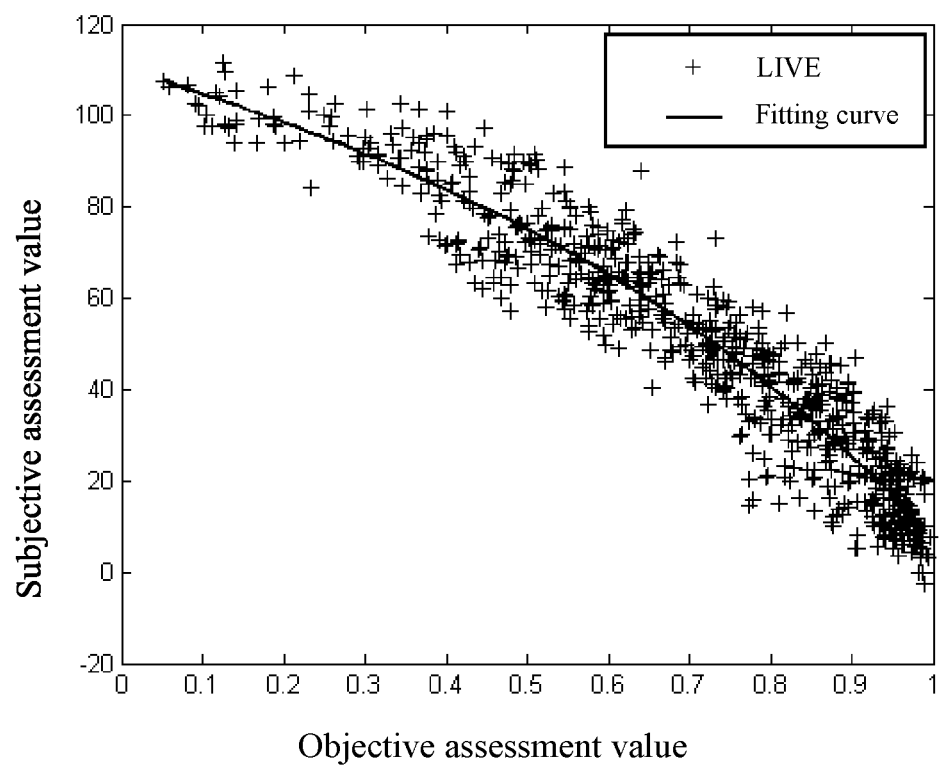
FIG. 2a is a (scattered point)-(fitting curve) graph of the objective assessment method on a LIVE image database according to the preferred embodiment of the present invention.
Figure 2B:
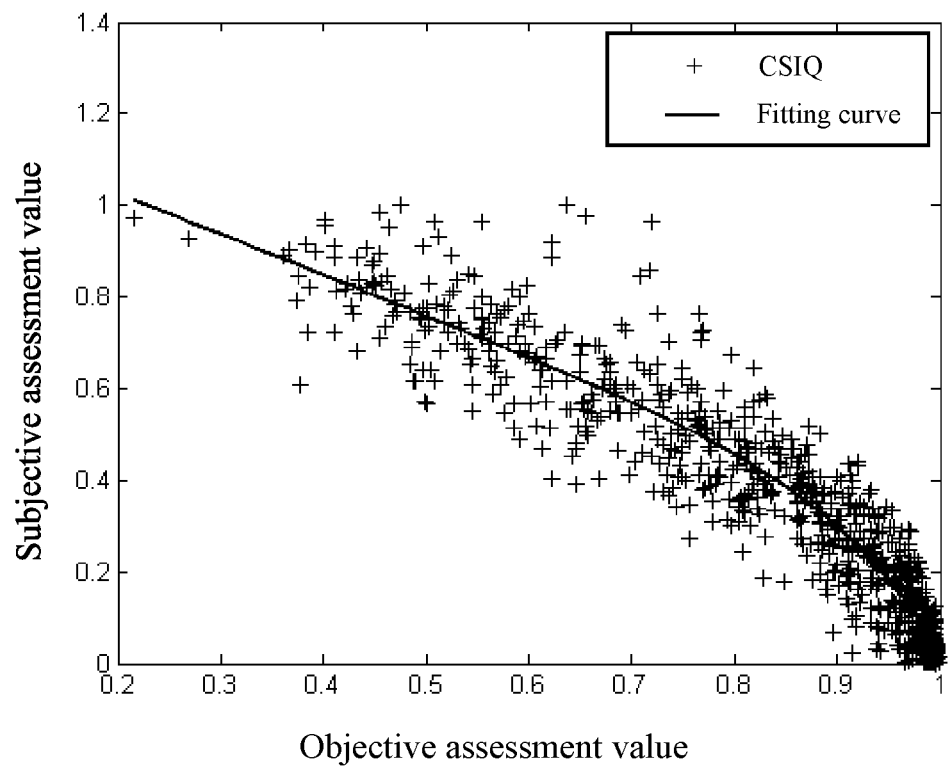
FIG. 2b is a (scattered point)-(fitting curve) graph of the objective assessment method on a CSIQ image database according to the preferred embodiment of the present invention.
Figure 2C:
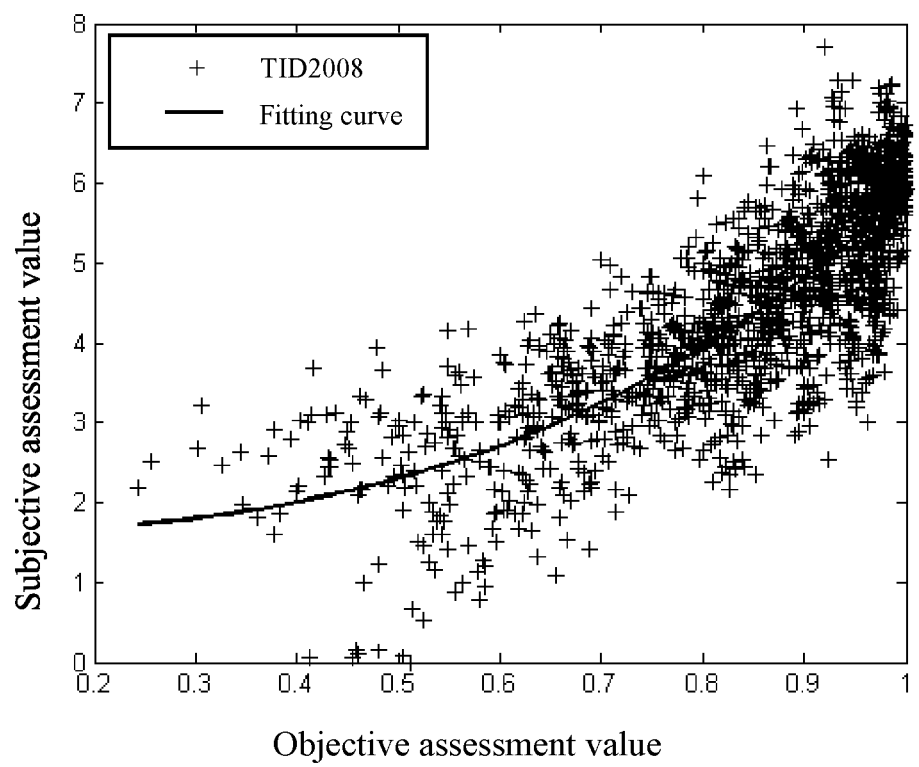
FIG. 2c is a (scattered point)-(fitting curve) graph of the objective assessment method on a TID2008 image database according to the preferred embodiment of the present invention.

FIG. 2a shows a (scattered point)-(fitting curve) graph of the method provided by the present invention on the LIVE image database. FIG. 2b shows a (scattered point)-(fitting curve) graph of the method provided by the present invention on the CSIQ image database. FIG. 2c shows a (scattered point)-(fitting curve) graph of the method provided by the present invention on the TID2008 image database. From FIG. 2a, FIG. 2b, and FIG. 2c, it can be clearly seen that the scattered points are uniformly distributed near the fitting curve and show a good monotonicity and consistency.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An objective assessment method for a color image quality based on online manifold learning, comprising steps of:

① representing an undistorted reference image having a width W and a height H by $I^R$; and representing a distorted image to be assessed, which is corresponding to the $I^R$, by $I^D$;

② through a visual saliency detection algorithm, respectively obtaining saliency maps of the $I^R$ and the $I^D$, correspondingly denoted as $M^R$ and $M^D$; then, according to the $M^R$ and the $M^D$, calculating a maximum fusion saliency map, denoted as $M^F$; and denoting a pixel value of a pixel having coordinates of (x, y) in the $M^F$ as $M^F(x, y)$, $M^F(x, y)=\max(M^R(x, y), M^D(x, y))$, wherein: $1\leq x\leq W$, $1\leq y\leq H$; the max( ) is a function to find a maximum; the $M^R(x, y)$ represents a pixel value of a pixel having coordinates of $(x, y)$ in the $M^R$; and the $M^D(x, y)$ represents a pixel value of a pixel having coordinates of $(x, y)$ in the $M^D$;

③ respectively dividing the $I^R$, the $I^D$, the $M^R$, the $M^D$, and the $M^F$ into $$\frac{W \times H}{8 \times 8}$$

image blocks, which are not overlapping mutually and have a size of 8×8;

vectorizing color values of R, G, and B channels of all pixels in each image block of the $I^R$ and the $I^D$; denoting a color vector obtained through vectorizing the color values of the R, the G, and the B channels of all the pixels in a $j^{th}$ image block of the $I^R$ as $X_j^R$; denoting a color vector obtained through vectorizing the color values of the R, the G, and the B channels of all the pixels in a $j^{th}$ image block of the $I^D$ as $X_j^D$; wherein: the j has an initial value of 1, $$1 \leq j \leq \frac{W \times H}{8 \times 8};$$

both of the $X_j^R$ and the $X_j^D$ have a dimensionality of 192×1; values of a $1^{st}$ element to a $64^{th}$ element in the $X_j^R$ respectively correspond to the color value of the R channel of each pixel in the $j^{th}$ image block of the $I^R$ in a line-by-line scanning manner; values of a $65^{th}$ element to a $128^{th}$ element in the $X_j^R$ respectively correspond to the color value of the G channel of each pixel in the $j^{th}$ image block of the $I^R$ in the line-by-line scanning manner; values of a $129^{th}$ element to a $192^{nd}$ element in the $X_j^R$ respectively correspond to the color value of the B channel of each pixel in the $j^{th}$ image block of the $I^R$ in the line-by-line scanning manner; values of a $1^{st}$ element to a $64^{th}$ element in the $X_j^D$ respectively correspond to the color value of the R channel of each pixel in the $j^{th}$ image block of the $I^D$ in the line-by-line scanning manner; values of a $65^{th}$ element to a $128^{th}$ element in the $X_j^D$ respectively correspond to the color value of the G channel of each pixel in the $j^{th}$ image block of the $I^D$ in the line-by-line scanning manner; and values of a $129^{th}$ element to a $192^{nd}$ element in the $X_j^D$ respectively correspond to the color value of the B channel of each pixel in the $j^{th}$ image block of the $I^D$ in the line-by-line scanning manner; and vectorizing pixel values of all pixels in each image block of the $M^R$, the $M^D$, and the $M^F$; denoting a pixel value vector obtained through vectorizing the pixel values of all the pixels in a $j^{th}$ image block of the $M^R$ as $S_j^R$; denoting a pixel value vector obtained through vectorizing the pixel values of all the pixels in a $j^{th}$ image block of the $M^D$ as $S_j^D$; and denoting a pixel value vector obtained through vectorizing the pixel values of all the pixels in a $j^{th}$ image block of the $M^F$ as $S_j^F$; wherein: the $S_j^R$, the $S_j^D$, and the $S_j^F$ all have a dimensionality of 64×1; values of a $1^{st}$ element to a $64^{th}$ element in the $S_j^R$ respectively correspond to the pixel value of each pixel in the $j^{th}$ image block of the $M^R$ in the line-by-line scanning manner; values of a $1^{st}$ element to a $64^{th}$ element in the $S_j^D$ respectively correspond to the pixel value of each pixel in the $j^{th}$ image block of the $M^D$ in the line-by-line scanning manner; and values of a $1^{st}$ element to a $64^{th}$ element in the $S_j^F$ respectively correspond to the pixel value of each pixel in the $j^{th}$ image block of the $M^F$ in the line-by-line scanning manner;

④ calculating a saliency of each image block in the $M^F$; and denoting the saliency of the $j^{th}$ image block in the $M^F$ as $d_j$, $$d_j = \sum_{i=1}^{64} S_j^F(i),$$

wherein: $1\leq i\leq 64$ and the $S_j^F(i)$ represents a value of an $i^{th}$ element in the $S_j^F$;

orderly arranging the saliencies of all the image blocks in the $M^F$, from the biggest to the smallest; and, after arranging, determining sequence numbers of the image blocks corresponding to former $t_1$ saliencies, wherein:

$$t_1 = \lambda_1 \times \frac{W \times H}{8 \times 8};$$

the $\lambda_1$ represents an image block selection proportionality coefficient; and $\lambda_1 \in (0,1]$; and finding the image blocks in the $I^R$, which are corresponding to the determined $t_1$ sequence numbers, and defining as reference image blocks; finding the image blocks in the $I^D$, which are corresponding to the determined $t_1$ sequence numbers, and defining as distorted image blocks; finding the image blocks in the $M^R$, which are corresponding to the determined $t_1$ sequence numbers, and defining as reference saliency image blocks; finding the image blocks in the $M^D$, which are corresponding to the determined $t_1$ sequence numbers, and defining as distorted saliency image blocks;

⑤ measuring a saliency difference between each reference image block in the $I^R$ and a corresponding distorted image block in the $I^D$ through an absolute difference; and denoting a saliency difference between a $t'^{th}$ reference image block in the $I^R$ and a $t'^{th}$ distorted image block in the $I^D$ as $e_{t'}$, $$e_{t'} = \frac{1}{64}\sum_{i=1}^{64} |\tilde{S}_{t'}^R(i) - \tilde{S}_{t'}^D(i)|,$$

wherein: the t' has an initial value of 1, $1\leq t'\leq t_1$; the symbol "||" is an absolute value symbol; the $\tilde{S}_{t'}^R(i)$ represents a value of an $i^{th}$ element in a pixel value vector $\tilde{S}_{t'}^R$ corresponding to a $t'^{th}$ reference saliency image block in the $M^R$; and the $\tilde{S}_{t'}^D(i)$ represents a value of an $i^{th}$ element in a pixel value vector $\tilde{S}_{t'}^D$ corresponding to a $t'^{th}$ distorted saliency image block in the $M^D$; and orderly arranging the measured $t_1$ saliency differences, from the biggest to the smallest; after arranging, determining the reference image blocks and the distorted image blocks corresponding to former $t_2$ saliency differences; defining the determined $t_2$ reference image blocks as reference visual important image blocks, and adopting a matrix formed by color vectors corresponding to all the reference visual important image blocks as a reference visual important image block matrix, denoted as $Y^R$; defining the determined $t_2$ distorted image blocks as distorted visual important image blocks, and adopting a matrix formed by color vectors corresponding to all the distorted visual important image blocks as a distorted visual important image block matrix, denoted as $Y^D$; wherein: $t_2=\lambda_2 \times t_1$, the $\lambda_2$ represents a selection proportionality coefficient of the reference image blocks and the distorted image blocks, and $\lambda_2 \in (0,1]$; the $Y^R$ and the $Y^D$ have a dimensionality of $192 \times t_2$; a $t''^{th}$ column vector in the $Y^R$ is a color vector corresponding to a determined $t''^{th}$ reference visual important image block; a $t''^{th}$ column vector in the $Y^D$ is a color vector corresponding to a determined $t''^{th}$ distorted visual important image block; and the $t''$ has an initial value of 1, $1 \le t'' \le t_2$;

⑥ centralizing the $Y^R$ through subtracting a mean value of values of all elements in each column vector from a value of each element in the same column vector of the $Y^R$; and denoting an obtained centralized matrix as Y, wherein the Y has a dimensionality of $192 \times t_2$; and processing the Y with dimensionality reduction and whitening through a principal component analysis; and, denoting an obtained matrix after the dimensionality reduction and the whitening as $Y^w$, $Y^w = W \times Y$; wherein: the $Y^w$ has a dimensionality of $M \times t_2$; the W represents a whitened matrix and has a dimensionality of $M \times 192$, $1 < M << 192$; and the symbol "<<" is a much-less-than symbol;

⑦ online training the $Y^w$ through an orthogonal locality preserving projection algorithm; and obtaining a characteristic basis matrix of the $Y^w$, denoted as D, wherein the D has a dimensionality of $M \times 192$;

⑧ according to the $Y^R$ and the D, calculating a manifold eigenvector of each reference visual important image block; denoting the manifold eigenvector of a $t''^{th}$ reference visual important image block as $u_{t''}$, $u_{t''} = D \times y_{t''}^R$, wherein: the $u_{t''}$ has a dimensionality of $M \times 1$, and the $y_{t''}^R$ is the $t''^{th}$ column vector in the $Y^R$; according to the $Y^D$ and the D, calculating a manifold eigenvector of each distorted visual important image block; and denoting the manifold eigenvector of a $t''^{th}$ distorted visual important image block as $v_{t''}$, $v_{t''} = D \times y_{t''}^D$, wherein: the $v_{t''}$ has a dimensionality of $M \times 1$, and the $y_{t''}^D$ is the $t''^{th}$ column vector in the $Y^D$; and ⑨ according to the manifold eigenvectors of all the reference visual important image blocks and the manifold eigenvectors of all the distorted visual important image blocks, calculating an objective quality assessment value of the $I^D$, denoted as Score, $$\text{Score} = \frac{1}{t_2 \times M} \sum_{t''=1}^{t_2} \sum_{m=1}^{M} \frac{2 \times u_{t''}(m) \times v_{t''}(m) + c}{(u_{t''}(m))^2 + (v_{t''}(m))^2 + c},$$

wherein: $1 \le m \le M$; the $u_{t''}(m)$ represents a value of an $m^{th}$ element in the $u_{t''}$; the $v_{t''}(m)$ represents a value of an $m^{th}$ element in the $v_{t''}$; and the c is a small constant for guaranteeing a result stability.

2. The objective assessment method for the color image quality based on the online manifold learning, as recited in claim 1, wherein the $Y^w$ in the step ⑥ is obtained through following steps of:

⑥_1, representing a covariance matrix of the Y by C, $$C = \frac{1}{t_2}(Y \times Y^T),$$

wherein: the C has a dimensionality of $192 \times 192$, and the $Y^T$ is a transposition of the Y;

⑥_2, processing the C with eigenvalue decomposition, and obtaining all maximum eigenvalues and corresponding eigenvectors, wherein the eigenvectors have a dimensionality of $192 \times 1$;

⑥_3, choosing M maximum eigenvalues and corresponding M eigenvectors;

⑥_4, according to the chosen M maximum eigenvalues and the corresponding M eigenvectors, calculating the whitened matrix W, $W = \Psi^{-1/2} \times E^T$, wherein: the $\Psi$ has a dimensionality of $M \times M$, $\Psi = \text{diag}(\psi_1, \ldots, \psi_M)$, $\Psi^{-1/2} = \text{diag}(1/\sqrt{\psi_1}, \ldots, 1/\sqrt{\psi_M})$; the E has a dimensionality of $192 \times M$, $E = [e_1, \ldots, e_M]$; the diag( ) is a main-diagonal matrix representation; the $\psi_1, \ldots, \psi_M$ correspondingly represent a $1^{st}$ to a $M^{th}$ chosen maximum eigenvalue; and, the $e_1, \ldots, e_M$ correspondingly represent a $1^{st}$ to a $M^{th}$ chosen eigenvector; and ⑥_5, according to the W, processing the Y with the whitening, and obtaining the $Y^w$ after the dimensionality reduction and the whitening, $Y_w = W \times Y$.

3. The objective assessment method for the color image quality based on the online manifold learning, as recited in claim 1, wherein: in the step ④, $\lambda_1 = 0.7$.

4. The objective assessment method for the color image quality based on the online manifold learning, as recited in claim 1, wherein: in the step ⑤, $\lambda_2 = 0.6$.

5. The objective assessment method for the color image quality based on the online manifold learning, as recited in claim 1, wherein: in the step ⑨, c=0.04.

* * * * *